US011724938B2

(12) United States Patent
Zhou et al.

(10) Patent No.: US 11,724,938 B2
(45) Date of Patent: Aug. 15, 2023

(54) METHODS FOR PRODUCTION OF HYDROGEN

(71) Applicant: Research Triangle Institute, Research Triangle Park, NC (US)

(72) Inventors: Shaojun James Zhou, Research Triangle Park, NC (US); Raghubir P. Gupta, Research Triangle Park, NC (US); John Reeves Carpenter, Research Triangle Park, NC (US); Brian S. Turk, Research Triangle Park, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 298 days.

(21) Appl. No.: 16/652,318

(22) PCT Filed: Sep. 24, 2018

(86) PCT No.: PCT/US2018/052394
§ 371 (c)(1),
(2) Date: Mar. 30, 2020

(87) PCT Pub. No.: WO2019/067349
PCT Pub. Date: Apr. 4, 2019

(65) Prior Publication Data
US 2020/0231435 A1 Jul. 23, 2020

Related U.S. Application Data

(60) Provisional application No. 62/565,873, filed on Sep. 29, 2017.

(51) Int. Cl.
*C01B 3/56* (2006.01)
*C01B 3/36* (2006.01)
(Continued)

(52) U.S. Cl.
CPC ............. *C01B 3/56* (2013.01); *C01B 3/366* (2013.01); *C01B 3/48* (2013.01); *C01B 3/501* (2013.01);
(Continued)

(58) Field of Classification Search
CPC .. C01B 3/56; C01B 3/366; C01B 3/48; C01B 3/501; C01B 2203/0255;
(Continued)

(56) References Cited

U.S. PATENT DOCUMENTS 2,605,175 A 7/1952 Barber
4,409,196 A 10/1983 Skinner et al.
(Continued)

FOREIGN PATENT DOCUMENTS

CN 106621696 A 5/2017
EP 0178833 B1 4/1989
(Continued)

OTHER PUBLICATIONS

International Report of Patentability for corresponding PCT/US2018/052394, dated Apr. 9, 2020 (6 pages).
(Continued)

*Primary Examiner* — Steven J Bos
*Assistant Examiner* — Syed T Iqbal
(74) *Attorney, Agent, or Firm* — Nathan P. Letts; Olive Law Group, PLLC

(57) ABSTRACT

Synthesis gas containing nitrogen as the majority component is processed to increase the hydrogen to carbon dioxide ratio. Nitrogen, carbon dioxide, and other contaminants are subsequently removed by a purification unit to produce a purified hydrogen gas stream. A recycle stream within the purification unit helps achieve a hydrogen purity greater than 99.9 percent, and hydrogen recovery greater than 99 percent.

12 Claims, 4 Drawing Sheets

(51) Int. Cl.
*C01B 3/48* (2006.01)
*C01B 3/50* (2006.01)

(52) U.S. Cl.
CPC ........... *C01B 2203/0255* (2013.01); *C01B 2203/0283* (2013.01); *C01B 2203/043* (2013.01); *C01B 2203/0405* (2013.01); *C01B 2203/0475* (2013.01); *C01B 2203/1241* (2013.01); *C01B 2203/146* (2013.01); *C01B 2203/148* (2013.01)

(58) Field of Classification Search
CPC .... C01B 2203/0283; C01B 2203/0405; C01B 2203/043; C01B 2203/0475; C01B 2203/1241; C01B 2203/146; C01B 2203/148; C01B 2203/025; C01B 2203/0465; C01B 3/36; C10G 2/32; C10K 1/005; C10K 1/32; C10K 3/04; C10K 1/002; C10K 1/007; C10L 3/08
See application file for complete search history.

(56) References Cited

U.S. PATENT DOCUMENTS

| | | | |
|---|---|---|---|
| 4,846,851 | A | 7/1989 | Guro et al. |
| 2004/0182002 | A1 | 9/2004 | Malhotra et al. |
| 2010/0031775 | A1 | 2/2010 | Seo et al. |
| 2010/0317751 | A1* | 12/2010 | Van Brugge ............ C01B 3/503 95/55 |
| 2011/0064641 | A1 | 3/2011 | Iijima |
| 2011/0223100 | A1 | 9/2011 | Monereau et al. |
| 2013/0031931 | A1 | 2/2013 | Seiler et al. |
| 2013/0319231 | A1* | 12/2013 | Jamal ................. B01D 53/229 95/45 |
| 2014/0163121 | A1 | 6/2014 | Allam |
| 2015/0323248 | A1 | 11/2015 | Terrien et al. |
| 2016/0045861 | A1 | 2/2016 | Haldor Topsoe |

FOREIGN PATENT DOCUMENTS

| | | |
|---|---|---|
| EP | 2233433 A1 | 9/2010 |
| JP | S61117101 A | 6/1986 |
| RU | 2343109 C2 | 1/2009 |
| RU | 2495914 C2 | 10/2013 |
| RU | 2015105188 A | 9/2016 |
| WO | 2004083114 A2 | 9/2004 |
| WO | 2009155554 A2 | 12/2009 |
| WO | 2011067326 A1 | 6/2011 |
| WO | 2014012629 A2 | 1/2014 |
| WO | WO 2015015433 A1 | 2/2015 |

OTHER PUBLICATIONS

International Search Report for corresponding PCT/US2018/052394, dated Mar. 13, 2019 (4 pages).
Lim, Emmanuel G, et al., "The Engine Reformer: Syngas Production in an Engine for Compact Gas-to-Liquids Synthesis." The Canadian Journal of Chemical Engineering 94.4 (2016) (34 pages).
Office Action from China National Intellectual Property Administration (CPO) regarding related CN application 201880058657X dated Dec. 23, 2020 (eleven (11) pages).
English translation of Office Action from CPO regarding related CN application 201880058657X dated Dec. 23, 2020 (eight (8) pages).
Extended European Search Report in related PCT application PCT/US2018052394 dated May 4, 2021. (eight (8) pages).
Office Action issued in related Chinese Application No. 201880058657X dated Jun. 25, 2021. (7 pages).
Office Action issued in related Chinese Application No. 201880058657X dated Jun. 25, 2021 English Translation (9 pages).
Office Action issued in related Indian Application No. 202017004773 dated Oct. 8, 2021 (6 pages).
Office Action for associated Russian patent application No. 2020103223 dated Feb. 28, 2022 (8 pages).
Translation of Office Action for associated Russian patent application No. 2020103223 dated Feb. 28, 2022 (7 pages).
Search Report for associated Russian patent application No. 2020103223 dated Feb. 28, 2022 (2 pages).
Translation of Search Report for associated Russian patent application No. 2020103223 dated Feb. 28, 2022 (2 pages).
Office Action from associated Saudi Arabia Patent Application No. 520411404 dated Jun. 25, 2022 (13 pages).
Office Action from associated Japanese Patent Application No. 2020-503875 dated Aug. 16, 2022 (10 pages).
Second Examination Report dated Dec. 18, 2022 for associated Saudi Arabian Patent Application No. 520411404 (10 pages).
English Summary of Second Examination Report dated Dec. 18, 2022 for associated Saudi Arabian Patent Application No. 520411404 (4 pages).

* cited by examiner

METHODS FOR PRODUCTION OF HYDROGEN

RELATED APPLICATIONS

This application is a § U.S. National Stage of International Application PCT/US18/52394, filed Sep. 24, 2018, which claims the benefit of U.S. Provisional Patent Application Ser. No. 62/565,873, filed Sep. 29, 2017, titled "METHODS AND APPARATUS FOR PRODUCTION OF HYDROGEN" the content of which are hereby incorporated by reference in their entireties.

TECHNICAL FIELD

The present invention generally relates to the treating or purifying of a gas stream, particularly removing nitrogen and carbon dioxide from a gas stream to produce hydrogen.

BACKGROUND

Hydrogen ($H_2$) is one of the most important industrial gases, used widely in petroleum refineries and petrochemical plants. Hydrogen is also used in semi-conductor industry, steel production, food industry, power industry and the like. Lately, hydrogen has become a fuel of choice for fuel cell-operated systems like automobiles, forklifts, etc. Hydrogen is typically produced at large scale using high-temperature reforming or partial oxidation of methane and/or hydrocarbons or through gasification of carbonaceous feedstocks. Production of smaller volumes of hydrogen presents significant cost and reliability challenges and is not widely practiced in the industry, except through electrolysis of water.

With recent market penetration of fuel cell-based vehicles (including passenger cars, buses, trucks) and equipment (e.g., forklifts used in warehouses), on-site production of hydrogen in 200-300 kg/day quantities is a key enabling process technology for continued and accelerated growth of the overall fuel cell market and the fuel cell-based vehicular market in particular. There are no technically viable or cost-effective options for production of hydrogen on-site at this scale. Electrolysis of water using electricity in an electrochemical cell is expensive and suffers from reliability issues. Steam methane reformers or coal gasifiers cannot be scaled down in a cost-effective manner to produce these small quantities of hydrogen.

High-temperature reforming of methane and hydrocarbons produces an intermediate gas stream which is referred to as synthesis gas or "syngas". Syngas can also be produced from partial oxidation and gasification of organic feedstocks (coal, petroleum coke, biomass, oil, hydrocarbons). When oxygen is used as the oxidizing agent in these processes, the syngas consists of primarily carbon monoxide (CO), $H_2$, carbon dioxide ($CO_2$), and steam. When air is used as the oxidizing agent, the large fraction of nitrogen ($N_2$) in air becomes the major component in the syngas with CO, $H_2$, $CO_2$ and steam representing minor components. For many processes, it is desirable to separate a high purity $H_2$ gas from the syngas. For syngas production based on the utilization of air rather than oxygen as an oxidizing agent, this increases the complexity of the $H_2$ separation process as the nitrogen, which is the majority component must also be removed. For example, polymer electrolyte membrane fuel cells for automotive applications require 99.97 percent or greater purity $H_2$ gas because contaminants within the $H_2$ gas can interfere with or poison electrocatalysts in the fuel cell. High purity $H_2$ may also be used in propellants, semiconductor manufacturing, analytical instrumentation, and as the starting material in the production of a variety of chemicals.

Conventional processes to purify syngas generated using oxygen as the oxidizing agent to produce high-purity hydrogen require a series of gas processing and cleanup steps, including separate removal of $CO_2$ using solvent scrubbing, followed by pressure-swing adsorption to achieve the highest levels of $H_2$ purity. The tail gas produced by pressure swing adsorption is typically used as a fuel gas for heating value, resulting in significant loss of $H_2$, rendering these processes to be inefficient and costly. For syngas generated using air as the oxidizing agent, the high nitrogen concentration in the syngas can only be separated by pressure-swing adsorption, but the resulting tail gas contains a large amount of nitrogen, which reduces its fuel value and increases $H_2$ losses. Because of these issues, syngas generated with air as the oxidant is not used for commercial hydrogen production as it is not cost competitive.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for producing a purified hydrogen gas stream comprises flowing a syngas produced from partial oxidation of hydrocarbons into a processing unit to produce an enhanced gas. The syngas typically contains $N_2$ (as the majority component), $H_2$, CO, $CO_2$, and $H_2O$, and may contain trace amounts of $H_2S$, COS, $CS_2$, $NH_3$, HCN, oxygen and inert gases like Ar. The syngas fed to the processing unit may have an initial $H_2$ to CO molar ratio, and the enhanced gas may have a second $H_2$ to CO ratio greater than the initial $H_2$ to CO ratio. The enhanced gas may subsequently flow into a purification unit. The purification unit may produce a purified $H_2$ gas stream and a tail gas. The purification unit may comprise a bulk separation unit to perform the bulk separation of the impurities into an impurity-rich byproduct and an enriched $H_2$ product and a second separation unit for producing a high purity $H_2$ product and tail gas with the remaining impurities. At least a portion of the tail gas may be recycled to a point upstream of the bulk separation unit.

According to another embodiment, a method for producing a purified hydrogen gas stream comprises flowing a feed gas containing $N_2$ as the majority component, $H_2$, and CO into a processing unit to produce an enhanced gas. The feed gas may have an initial $H_2$ to CO ratio, and the enhanced gas may have a second $H_2$ to CO ratio greater than the initial $H_2$ to CO ratio. The enhanced gas may flow into contact with a membrane in a membrane unit to produce a permeate stream and a retentate stream. The membrane may have a $H_2$-selective composition. A concentration of $H_2$ in the permeate stream may be greater than a concentration of $H_2$ in the enhanced gas, and the retentate stream may comprise $N_2$ and other impurities that are removed from the enhanced gas. The permeate stream may flow into contact with an adsorbent material in one or more adsorption columns to produce a purified $H_2$ gas stream. The adsorbent material in one or more of the adsorption columns may be regenerated to produce a tail gas. At least a portion of the tail gas may be recycled to mix into the enhanced gas stream at a point upstream of the membrane unit.

According to another embodiment, a method for producing purified hydrogen gas stream comprises flowing a feed gas that is typically produced from gasification of coal and/or petroleum coke and which may contain appreciable quantities of $H_2S$ and COS in addition to $N_2$, CO, $H_2$, $CO_2$, and $H_2O$ into a desulfurization unit as disclosed in U.S. Pat. No. 6,951,635 producing a very-low sulfur containing syngas, which is subsequently fed into a processing unit to produce an enhanced gas. The feed gas may have an initial $H_2$ to CO ratio, and the enhanced gas may have a second $H_2$ to CO ratio greater than the initial $H_2$ to CO ratio. The enhanced gas may flow into contact with a membrane in a membrane unit to produce a permeate stream and a retentate stream. The membrane may have a $H_2$-selective composition. A concentration of $H_2$ in the permeate stream may be greater than a concentration of $H_2$ in the enhanced gas, and the retentate stream may comprise $N_2$ and other impurities that are removed from the enhanced gas. The permeate stream may flow into contact with an adsorbent material in one or more adsorption columns to produce a purified $H_2$ gas stream. The adsorbent material in one or more of the adsorption columns may be regenerated to produce a tail gas. At least a portion of the tail gas may be recycled to mix into the enhanced gas stream at a point upstream of the membrane unit.

According to another embodiment, a gas processing system is configured for performing any of the methods disclosed herein.

According to another embodiment, a gas processing system for producing a purified hydrogen gas stream comprises: a processing unit configured to increase a $H_2$ to CO ratio in a feed gas to produce an enhanced gas; a first separation unit configured to remove a substantial portion of $N_2$ gas from the enhanced gas to produce a denitrogenated gas; a second separation unit configured to remove a substantial portion of $N_2$, $H_2O$, $CO_2$ and CO gases to produce a purified $H_2$ gas stream, the second separation unit also producing a tail gas containing residual $CO_2$, $N_2$, $H_2O$, $H_2$ and CO; and a recycling system for routing at least a portion of the tail gas to mix into the enhanced gas at a point upstream of the first separation unit.

According to another embodiment, a gas processing system for producing a purified hydrogen gas stream comprises: a processing unit configured to increase a $H_2$ to CO ratio in a feed gas to produce an enhanced gas; a separation unit configured to remove a substantial portion of $N_2$ and $CO_2$ to produce a purified $H_2$ gas stream, the second separation unit also producing a tail gas with any remaining impurities; and a recycling system for routing at least a portion of the tail gas to mix into the enhanced gas at a point upstream of the first separation unit.

While much of the disclosure focuses on $N_2$ and $CO_2$ removal processes. Another way to think of the disclosed process is that it separates a majority of the $H_2$ from the contaminants and then selectively removes any remaining impurities from the $H_2$. The benefit of the unique combination of these individual separation steps is that $H_2$ loss can be minimized to near zero by recycle of the tail gas stream.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
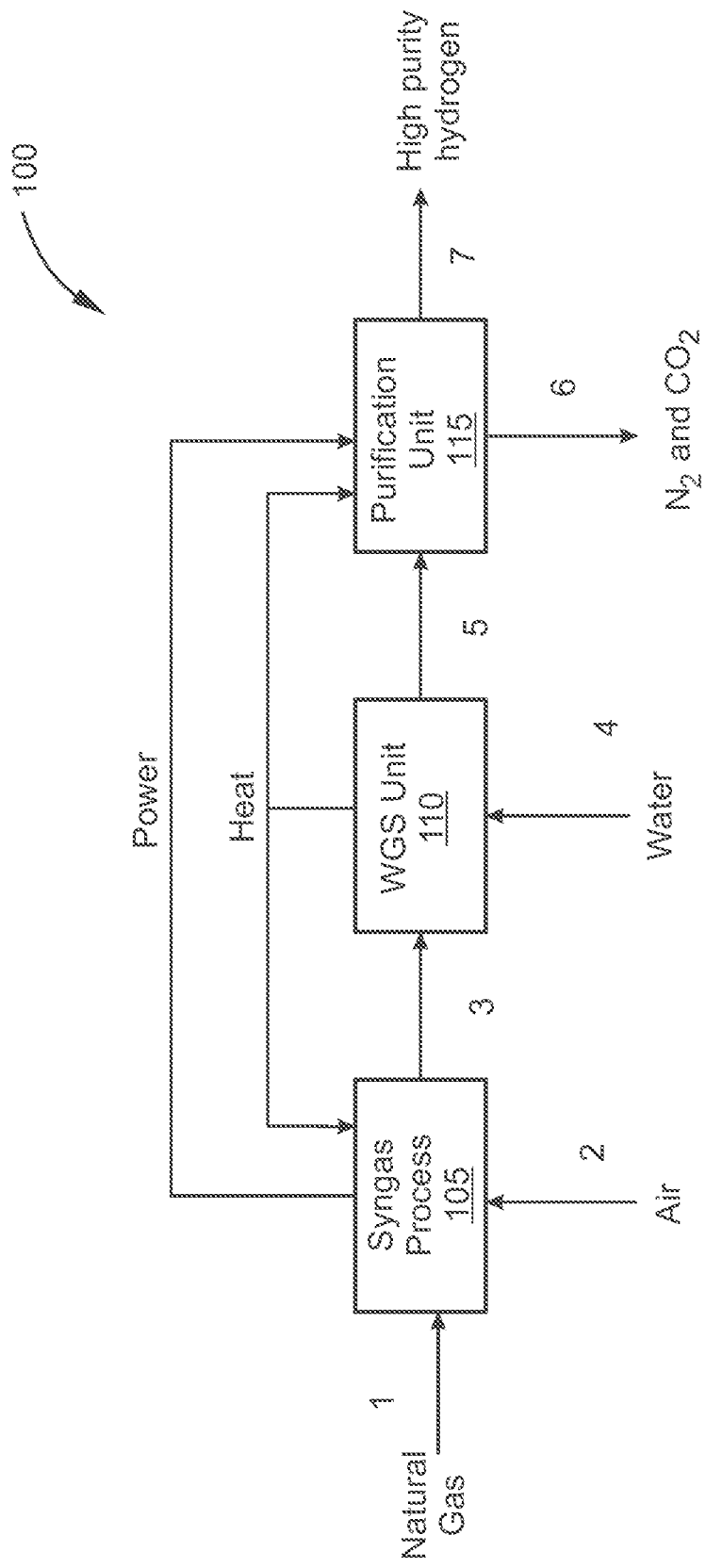
FIG. 1 is a schematic view of an example of a gas processing system in which hydrogen purification methods disclosed herein may be implemented according to some embodiments.

As used herein, the term "syngas" refers to synthesis gas. In the context of the present disclosure, syngas is a mixture of at least carbon monoxide (CO) and diatomic hydrogen gas ($H_2$). Depending on the embodiment, syngas may additionally include other components such as, for example, water, air, diatomic nitrogen gas ($N_2$), diatomic oxygen gas ($O_2$), carbon dioxide ($CO_2$), sulfur compounds (e.g., hydrogen sulfide ($H_2S$), carbonyl sulfide (COS), sulfur oxides ($SO_x$), etc.), nitrogen compounds (e.g., nitrogen oxides ($NO_x$), etc.), metal carbonyls, hydrocarbons (e.g., methane ($CH_4$)), ammonia ($NH_3$), chlorides (e.g., hydrogen chloride (HCl)), hydrogen cyanide (HCN), trace metals and metalloids (e.g., mercury (Hg), arsenic (As), selenium (Se), cadmium (Cd), etc.) and compounds thereof, particulate matter (PM), etc.

As used herein, the term "natural gas" refers to a mixture of hydrocarbon (HC) gases consisting primarily of methane and lesser amounts of higher alkanes. Depending on the embodiment, natural gas may additionally include non-HC species such as one or more of those noted above, as well as carbon disulfide ($CS_2$) and/or other disulfides, and mercaptans (thiols) such as methanethiol ($CH_3SH$) and ethanethiol ($C_2H_5SH$), thiophene, and other organosulfur compounds.

As used herein, the term "fluid" generally encompasses the term "liquid" as well as term "gas" unless indicated otherwise or the context dictates otherwise. The term "fluid" encompasses a fluid in which particles are suspended or carried. The term "gas" encompasses a gas that includes or entrains a vapor or liquid droplets. The term "fluid," "liquid" or "gas" encompasses a "fluid," "liquid" or "gas" that includes a single component (species) or a mixture of two or more different components. Examples of multicomponent mixtures include, but are not limited to, syngas and natural gas as described above.

As used herein, the term "process gas" generally refers to any gas initially containing $H_2$ and one or more contaminants. A process gas at an initial stage of a gas processing method as disclosed herein, i.e., when introduced into a gas processing system as disclosed herein, may also be referred to as a "raw gas" or a "feed gas." A process gas after undergoing contaminant removal according to a gas processing method as disclosed herein may also be referred to as an "enhanced gas," a "purified gas," or a "permeate stream." The term "process gas" generally is not limiting as to the composition of the gas at any particular stage of the gas processing method. For example, the term "process gas" does not by itself provide any indication of the concentrations of $H_2$ or any contaminants in the gas at any particular time. Examples of process gases include, but are not limited to, syngas and natural gas as described above. Further examples of process gases are gases that include one or more of: CO, $CO_2$, $H_2$, $N_2$, and hydrocarbon(s) (HCs).

As used herein "selectivity" of a gas separation membrane in separating a two-component gas mixture is defined as the ratio of the gas permeances of the two components in a gas mixture. Selectivity may be obtained directly by contacting a gas separation membrane with a known mixture of gases and analyzing the permeate. Alternatively, a first approximation of the selectivity is obtained by measuring permeance of the gases separately on the same gas separation membrane.

The present disclosure provides methods for purifying a syngas in which $N_2$ is the majority component (i.e., has the highest mole fraction of any component in the syngas) to produce a purified $H_2$ gas stream. In various embodiments as illustrated in FIG. 1, an exemplary gas processing system 100 may comprise a syngas reaction unit 105. In a non-limiting embodiment, the syngas reaction unit 105 may have a raw gas feed (indicated by stream 1 in FIG. 1) that serves as a fuel, and an oxidizer feed (stream 2) such as air, enriched air, and oxygen, in certain embodiments, the oxidant may also contain steam and/or $CO_2$. The raw gas feed (stream 1) may be, for example, a low-quality hydrocarbon stream from an industrial process or from a natural gas or crude oil production process. The fuel may also comprise natural gas containing primarily methane ($CH_4$). In certain embodiments, the fuel to the syngas reaction unit 105 may be coal, petroleum coke, biomass, or any other carbonaceous feedstock.

In certain embodiments, the syngas reaction unit 105 may comprise an internal combustion engine operated under fuel-rich conditions to partially oxidize the fuel (as opposed to operating the engine to completely combust the fuel) to produce syngas (stream 3) comprising $N_2$, $H_2$, CO, and various contaminants. The syngas (stream 3) may flow to a water-gas shift (WGS) unit 110 along with a water feed (stream 4) to produce an enhanced gas (stream 5) having a higher $H_2$ to CO ratio than the syngas (stream 3). The enhanced gas (stream 5) may flow to a purification unit 115 which may comprise one or more separation processes as discussed below to remove a portion of the contaminants from the enhanced gas (stream 5). The purification unit 115 may produce a high purity $H_2$ gas (stream 7) and a tail gas (stream 6) comprising $N_2$, $CO_2$, and other contaminants, as well as residual $H_2$.

In certain embodiments, the syngas reaction unit 105 may comprise a gasification unit operated to partially oxidize carbonaceous feedstocks to produce syngas (stream 3). In case of high-sulfur carbonaceous fuels used in syngas reaction unit 105, a desulfurization system operating at temperatures between 482 to 1292° F. (250 to 700° C.) as disclosed in the U.S. Pat. No. 6,951,635 is used prior to sending the syngas to the WGS unit to reduce the total sulfur concentration to less than 100 ppmv, preferably below 50 ppmv, and more preferably below 20 ppmv. Syngas from the desulfurization unit may flow to the water-gas shift (WGS) unit 110 along with a water feed (stream 4) to produce an enhanced gas (stream 5) having a higher $H_2$ to CO ratio than the syngas (stream 3). The enhanced gas (stream 5) may flow to a purification unit 115 which may comprise one or more separation processes as discussed below to remove a portion of the contaminants from the enhanced gas (stream 5). The purification unit 115 may produce a high purity $H_2$ gas (stream 7) and a tail gas (stream 6) comprising $N_2$, $CO_2$, and other contaminants, as well as residual $H_2$.

In certain embodiments, the syngas reaction unit 105 may comprise a partial oxidation system for which air is an oxidant operated to partially oxidize hydrocarbon feedstocks to produce syngas (stream 3). Syngas from the syngas reaction unit may flow to the water-gas-shift (WGS) unit 110 along with a water feed (stream 4) to produce an enhanced gas (stream 5) having a higher $H_2$ to CO ratio than the syngas (stream 3). The enhanced gas (stream 5) may flow to a purification unit 115 which may comprise one or more separation processes as discussed below to remove a portion of the contaminants from the enhanced gas (stream 5). The purification unit 115 may produce a high purity $H_2$ gas (stream 7) and a tail gas (stream 6) comprising $N_2$, $CO_2$, and other contaminants, as well as residual $H_2$.

In various embodiments, the syngas (stream 3) may have an initial $H_2$ to CO ratio of about 0.6 to about 3. In certain embodiments, the initial $H_2$ to CO ratio may range from about 1.5 to about 2.5. In certain embodiments, the second $H_2$ to CO ratio (i.e., the ratio in the enhanced gas (stream 5)) may range from about 8 to about 150. In certain embodiments, the second $H_2$ to CO ratio may range from about 8 to about 120. In certain embodiments, the second $H_2$ to CO ratio may range from about 8 to about 50.

For those embodiments utilizing an internal combustion engine as the syngas reaction unit 105, mechanical energy produced by the engine may be used to directly power or to operate a generator to produce electricity for a variety of equipment in the purification unit 115 such as pumps, compressors, controllers, etc. Alternatively, the power or electricity may be used for any other desired purpose. Additionally, in certain embodiments the WGS unit 110 may generate heat energy which may be utilized by other steps of the process 100. Although FIG. 1 may use an internal combustion engine with a fuel and oxidizer feed, such an arrangement is optional and various embodiments may use any source of syngas containing $H_2$ and CO. Likewise, any generation of power or heat within the process 100 and its subsequent use is optional.

The WGS reaction is utilized to shift a gas comprising the reactants of water and CO to the products of $CO_2$ and $H_2$ by reacting the CO with steam over a catalyst bed. WGS is an industrially important process utilized to increase the $H_2$ to CO ratio to meet the downstream process requirements of a particular application. For example, WGS finds applications in pre-combustion $CO_2$ capture where a fuel is partially oxidized, as discussed above for FIG. 1, to produce syngas predominantly consisting of CO and $H_2$. This syngas is shifted to maximize the $H_2$ and $CO_2$ concentrations, and $CO_2$ may be subsequently removed to produce high purity $H_2$. WGS also finds widespread applications in chemicals production where the $H_2$ to CO ratio needs to be adjusted as per the process requirements, such as methanol and Fischer-Tropsch applications.

WGS is a moderately exothermic reversible reaction and is expressed by:

$$CO + H_2O \leftrightarrow CO_2 + H_2$$

$$\Delta H^\circ_{298} = -41.09 \frac{\text{kiloJoules}}{\text{mole}} \left(\frac{kJ}{mol}\right)$$

where $\Delta H_{298}°$ is the enthalpy of reaction at 298 Kelvin (K).

The equilibrium constant of the reaction decreases with increasing temperature. The reaction is thermodynamically favored at low temperatures and kinetically favored at high temperatures. As there is no change in the volume from reactants to products, the reaction is not affected by pressure.

The equilibrium of this reaction shows significant temperature dependence and the equilibrium constant decreases with an increase in temperature, that is, higher carbon monoxide conversion is observed at lower temperatures. In order to take advantage of both the thermodynamics and kinetics of the reaction, the industrial scale WGS is conducted in multiple adiabatic stages with interstage cooling in-between the reactors.

The water gas shift process uses steam to shift CO to $CO_2$ and produces $H_2$ in the process. In addition to being a reactant, the steam also serves to move the equilibrium of the water gas shift forward to higher $H_2$, controlling the temperature rise from the exothermic water gas shift reaction, which if left unchecked could deactivate the catalyst. The steam is also required to prevent coking on the catalyst surface, which also deactivates the catalyst.

Traditionally, WGS is carried out using two reactors in series to carry out a high temperature shift (HTS) followed by a low temperature shift (LTS). Water is added to the syngas fed to the first reactor (WGS 1). The water may be in the form of steam. Alternatively, this water may be in the form of liquid water for which the thermal energy needed to generate steam is extracted from the sensible heat in the feed gas via direct mixing of the feed gas and liquid water via a spray nozzle or atomizer. The use of liquid water enables additional cooling of the feed gas to the desired temperature for the shift reaction in the first reactor and the consumption of water generated during cooling of the enhanced gas downstream of the water gas shift reactors. The syngas from the outlet of the first reactor (WGS 1) is cooled to the desired shift inlet temperature by using the excess heat to generate and/or raise the temperature of steam and the cooled syngas is fed to the second reactor (WGS 2).

No specific limitations are placed on the configuration of the shift reactors. Generally, each shift reactor may have any configuration suitable for carrying out the WGS reaction. For this purpose, each shift reactor generally may include a vessel having an inlet and an outlet, and a shift catalyst in the vessel. Depending on the type of shift catalyst utilized, each shift reactor may include a structural support for the shift catalyst.

In some embodiments, the first shift reactor (WGS 1) is configured or operated to carry out a high temperature shift (HTS) reaction, while the second shift reactor (WGS 2) is configured or operated to carry out a LTS reaction. In some embodiments, in an HTS reaction the inlet temperature of the gas fed to a shift reactor ranges, for example, from 570 to 700° F. (298 to 371° C.). In some embodiments, in a LTS reaction the inlet temperature of the gas fed to a shift reactor ranges, for example, from 400 to 550° F. (204° C. to 288° C.). Depending on the type of shift reaction performed in the respective shift reactors, the HTS and LTS reactors may contain different type of catalysts.

Generally, the shift catalyst may be provided and supported in any form suitable for carrying out the WGS reaction. For example, the shift catalyst may be provided as a fixed bed that is positioned in the shift reactor such that gases are able to flow through the catalyst bed. The composition of the shift catalyst may depend on the operating temperature of the shift reactor and the composition of the gas to be processed by the shift reactor.

For those embodiments utilizing an internal combustion engine as the syngas reaction unit 105, the syngas will contain a trace levels of unreacted oxygen. Typically, the presence of strong oxidizing agents like oxygen in the feed stream to a WGS unit will cause deactivation of the active metal oxidation state in the WGS catalyst. With the first WGS reactor (WGS 1) containing a HTS catalyst, the operating conditions and oxygen concentration are suitable for the catalytic conversion of any trace concentrations of oxygen present in the syngas feed from the engine operated to produce syngas into water with minimal adverse effect on catalyst activity. Therefore, in this embodiment, no separate oxygen removal system is needed.

Similarly, the standard iron-based HTS catalyst can tolerate up to 50 ppmv of sulfur compounds without any significant deactivation due to sulfur poisoning. Because of this, the trace quantifies of sulfur present in the feed natural gas for safety reasons (leak detection) will not impact the performance of the WGS process. Similarly, for the gasification embodiment using high sulfur carbonaceous feed and a desulfurization unit to reduce the sulfur concentration to less than 50 ppmv will enable use of a conventional HTS catalyst without any issue. These sulfur compounds will remain in the enhanced gas for ultimate removal in a more appropriate downstream separation process and no separate polishing sulfur removal is envisioned in this embodiment.

No specific limitations are placed on the type or configuration of the heat exchangers used in this the WGS process or purification processes. This means that any heat reduction system enabling control of the effluent syngas temperature to meet the temperature specification for the downstream process is satisfactory. Examples of potentially suitable heat exchangers are water cooled, air cooled, and/or other liquid coolants used with refrigeration cycles. Alternatively, the use of sensible heat of the feed gas to vaporize water and its cooling effect are particularly well suited for the WGS process enabling recycle of condensed water collected during cooling downstream of the WGS process while also providing steam for the WGS reaction.

Figure 2:
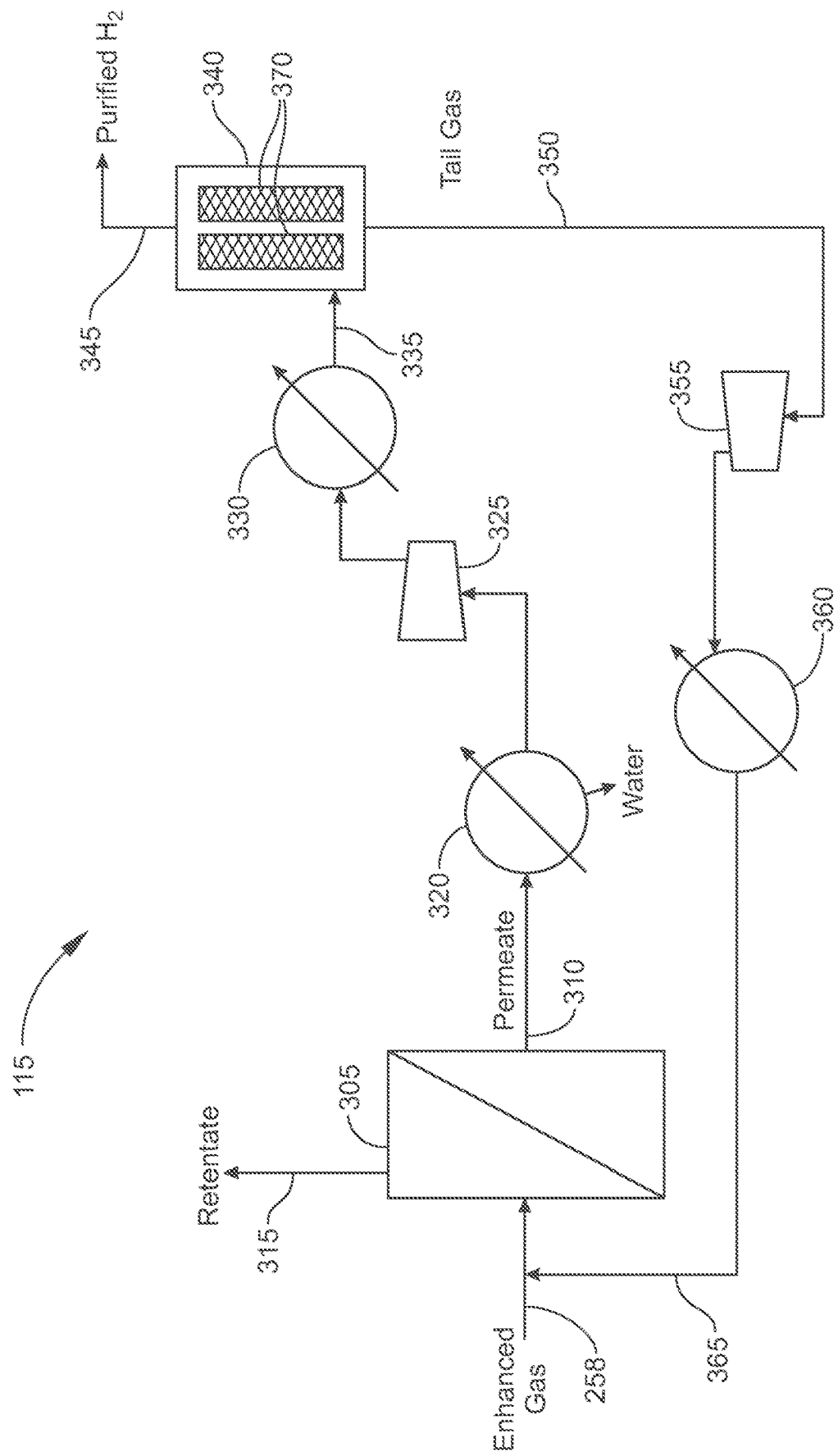
FIG. 2 is a schematic view of an example of a purification unit according to some embodiments.

The output of the WGS system 110 (stream 5) may be the input to the purification unit 115. FIG. 2 illustrates an exemplary purification unit 115 according to various embodiments. The enhanced gas may flow to first separation unit 305. In certain embodiments, the first separation unit 305 may comprise a membrane unit. The membrane unit may comprise a dense membrane with a $H_2$ selective composition, allowing $H_2$ to preferentially flow through the membrane unit in the permeate stream 310, while certain contaminants, namely $N_2$ and $CO_2$, are removed in the retentate stream 315. The membrane may comprise a semipermeable polymer (various membrane materials are known in the art, for example, but without limitation, such as a polyimide, polyamide, polyvinyl acetate, polysulfone, polytetrafluoroethylene (PFTE), cellulose acetate, other cellulose derivatives, polyether ether ketone, polybenzimidazole, polyolefins, etc.), a ceramic, a carbon compound, activated carbon, or a metallic compound. The $H_2$ selectivity, which is generally defined as the permeability of $H_2$ versus that of other gases in the mixture, of the membrane may range from 10 to 200, and the area of contact of the membrane may be determined from characteristics of the output stream 5 of the WGS system 110 and operating characteristics (e.g., temperature and pressure) of the membrane unit. In various embodiments, the membrane unit may operate at a temperature ranging from −4° F. to 480° F. (−20° C. to 250° C.) and a pressure ranging from 1 atm to 100 atm (101 kPa to 10,100 kPa). The membrane used for this purpose are preferably in the form of hollow fibers or flat sheets, and are modularized into spiral-wound design, plate and frame design, or hollow fiber design. For example, one such spiral-wound membrane is the commercially available cellulose acetate membrane modules supplied by UOP (Des Plaines, Ill.) for $CO_2$ separation from methane and one such hollow fiber membrane module is commercially supplied by Air Liquide (Houston, Tex.) for on-board nitrogen generation systems for $N_2$ separation from air.

Hydrogen permeation in dense membranes may occur through a solution-diffusion mechanism, wherein the gas molecules initially adsorb or dissolve onto the surface of the membrane material. Once adsorbed onto the membrane surface, the gas molecules may diffuse through the membrane material. In various embodiments, because the hydrogen selectivity of the membrane is much greater than the selectivity for each individual contaminant, very little of the contaminants (e.g., $N_2$, CO, $CO_2$, sulfur compounds) in the gas permeate through the membrane surface and such contaminants leave the membrane unit 305 in the retentate stream 315.

The permeate stream 310 may flow to a first heat exchanger 320 to remove water prior to increasing the pressure of the permeate stream 310 by compressor 325. Excess heat generated by the compression step may be removed by a second heat exchanger 330. The resulting pressurized stream 335 may flow to a second separation unit 340. The pressurized stream 335 may have a pressure ranging from 2 bar to 100 bar (200 kPa to 10,000 kPa) and a temperature ranging from 32° F. to 122° F. (0° C. to 50° C.). In certain embodiments, the second separation unit 340 may comprise a pressure swing adsorption (PSA) unit. PSA is based on one or more adsorbent beds 370 that capture contaminants in the pressurized stream 335 thereby allowing the $H_2$ to pass through the PSA unit, and then later releasing the adsorbed contaminants at a lower pressure (generally, lower than the pressure of the pressurized stream 335) when the adsorbent bed 370 is regenerated. This regenerate stream is the tail gas stream 350 in FIG. 2. Multiple adsorbent beds 370 may be utilized simultaneously so that a continuous stream of $H_2$ at purities greater than 99.9 percent may be produced. In a two-bed PSA process, the feed mixture contacts the first adsorbent bed containing adsorbents which preferentially adsorb certain components of the mixture. The less adsorbed component will break through the bed faster and produce a stream with high content of this component. The feed flow is switched to a second adsorbent bed before the other component(s) break through and the first bed is regenerated by desorbing the adsorbed compounds through the reduction of the total pressure of the system. The same process is repeated at the second adsorbent bed and for the complete PSA process. Other variations of PSA process with multiple beds operates under the same principle.

The adsorbent in PSA systems may be chosen for their ability to discriminate between different gases in a mixture. In certain embodiments, the adsorbent may be chosen to preferentially remove $CO_2$ from the pressurized stream 335. When multiple adsorbent beds 370 are used, the adsorbent in each adsorbent bed may be selected to preferentially remove one or more target contaminants. For example, one (or more) adsorbent beds 370 may target $CO_2$, while another adsorbent bed 370 targets $H_2S$, and yet another adsorbent bed 370 may target CO. The adsorbent works on the principle that gases under elevated pressures are attracted to a surface of a solid based on their affinity and may be captured or adsorbed onto that surface. Generally, the higher the pressure, the more gas that will be adsorbed. Once the pressure is reduced, the gas tends to desorb. Thus, an adsorbent bed 370 operating under pressure removes one or more contaminants from the pressurized stream 335, and the purified $H_2$ stream 345 flows out of the PSA unit 340. Once the adsorbent reaches its adsorption capacity, flow of the pressurized stream 335 to the adsorbent bed 370 is shut off and the pressure allowed to fall. As the pressure falls, the contaminants desorb from the surface of the adsorbent and flow out of the PSA unit 340 in the tail gas stream 350. The adsorbent may be any type known in the art, such as zeolites, activated carbon (including molecular sieves), alumina, silica gel, and resins.

In various embodiments, all or a portion of the tail gas stream 350 may be recycled to or upstream of the first separation unit 305 by combining the tail gas stream 350 with the enhanced gas stream 5 prior to flowing into the first separation unit 305. Although the adsorbent is selected to remove contaminants from the $H_2$ stream, some $H_2$ may be adsorbed and then discharged in the tail gas stream 350. Without recycling this stream, the $H_2$ in the tail gas 350 would be lost and overall recovery of $H_2$ by the process 100 may not be as good as with recycling of the tail gas 350. By recycling all of the tail gas 350, the process 100 may achieve a $H_2$ recovery rate of greater than 99 percent of the $H_2$ contained in the feed gas. Recycling less than 100 percent of the tail gas will reduce the $H_2$ recovery rate accordingly. For example, $H_2$ recovery of 75 percent or greater, 90 percent or greater, or 95 percent or greater may be achieved by varying the amount of tail gas recycled. In some embodiments, the amount of the tail gas recycled may range from about 50 percent to about 100 percent of the tail gas. If none of the tail gas 350 is recycled, then the $H_2$ recovery rate may be as low as 75 percent. In order to properly condition the tail gas 350 for recycling, the tail gas 350 may flow to a compressor 355 to increase pressure generally to that of the enhanced gas stream 5, and may then flow to a heat exchanger 360 to remove excess heat caused by compression. The conditioned tail gas 365 may then be mixed into the enhanced gas stream 5. In certain embodiments, the pressure of the recycled tail gas 350 may range from about 1 atm to about 10 atm (about 100 kPa to about 1,000 kPa) and matches that of stream 5.

In various embodiments, the recycled tail gas stream 350 may range from about 5 percent to about 10 percent by volume of the purified $H_2$ stream 345, and may range from about 15 percent to about 25 percent by volume of the enhanced gas stream 5. Thus, extremely high $H_2$ recovery rates (i.e., greater than 99 percent) may be achieved by a relatively small recycle stream. Table 1 presents the results of a material balance for the process illustrated in FIGS. 1 through 2, demonstrating production of a high purity $H_2$ stream containing 99.97 percent $H_2$.

TABLE 1

Material Balance for Overall Process (stream numbering corresponds to FIG. 1)

| Mole Fraction | Stream 1 Natural Gas | 2 Oxidizer (Air) | 3 Syngas | 4 Water | 5 Enhanced Gas | 6 Tail Gas | 7 High Purity $H_2$ |
|---|---|---|---|---|---|---|---|
| $H_2$ | | | 0.194 | | 0.3035 | 0.003 | 0.9997 |
| CO | | | 0.126 | | 0.021 | 0.031 | |
| $CO_2$ | 0.02 | | 0.025 | | 0.132 | 0.19 | |
| $CH_4$ | 0.98 | | 0.011 | | 0.011 | 0.016 | |
| $H_2O$ | | 0.023 | 0.130 | 1.0 | 0.014 | | |
| $N_2$ | | 0.771 | 0.511 | | 0.518 | 0.76 | 0.0003 |
| $O_2$ | | 0.205 | 0.002 | | | | |
| Molar Flow (kgmole/hr) | 3.4 | 13.9 | 20.8 | 1.0 | 20.4 | 13.9 | 6.15 |
| Mass Flow (kg/day) | 1351.3 | 9528.3 | 10963.2 | 432 | 10722.6 | 10306.0 | 295.1 |

Figure 3:
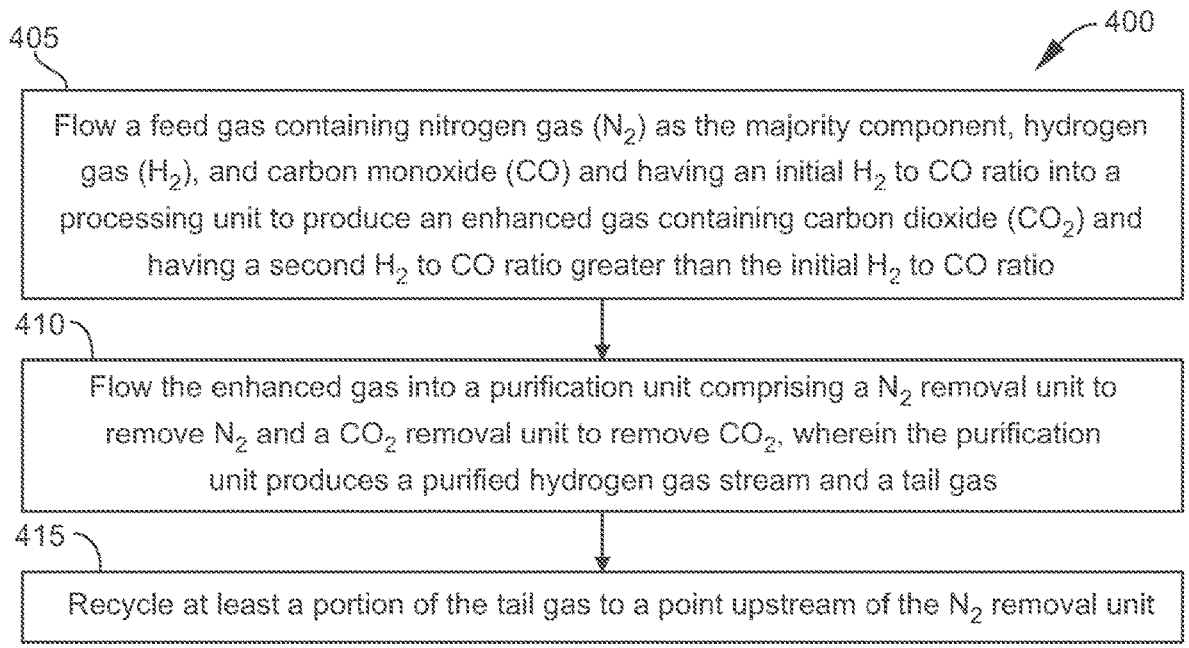
FIG. 3 is an exemplary flowchart of a method for producing a purified hydrogen gas stream according to some embodiments.

FIG. 3 illustrates a general flow diagram of various embodiments of a method 400 for producing a purified hydrogen gas stream. At step 405, a feed gas containing $N_2$ as the majority component, $H_2$, and CO may flow into a processing unit 110 to produce an enhanced gas 5. The feed gas may have an initial $H_2$ to CO ratio, and the enhanced gas 5 may contain $CO_2$ and may have a second $H_2$ to CO ratio greater than the initial $H_2$ to CO ratio. The enhanced gas 5 may flow into a purification unit 115 at step 410. The purification unit 115 is designed to produce high purity $H_2$ and may comprise a unit 305 to produce a stream 310 largely depleted of $N_2$, $CO_2$ and other non-$H_2$ gases and a unit 340 to produce a purified $H_2$ stream. The purification unit 115 may produce a purified $H_2$ gas stream 345 and a tail gas 350. At step 415, at least a portion of the tail gas 350 may be recycled to a point upstream of the $N_2$ removal unit 305.

Figure 4:
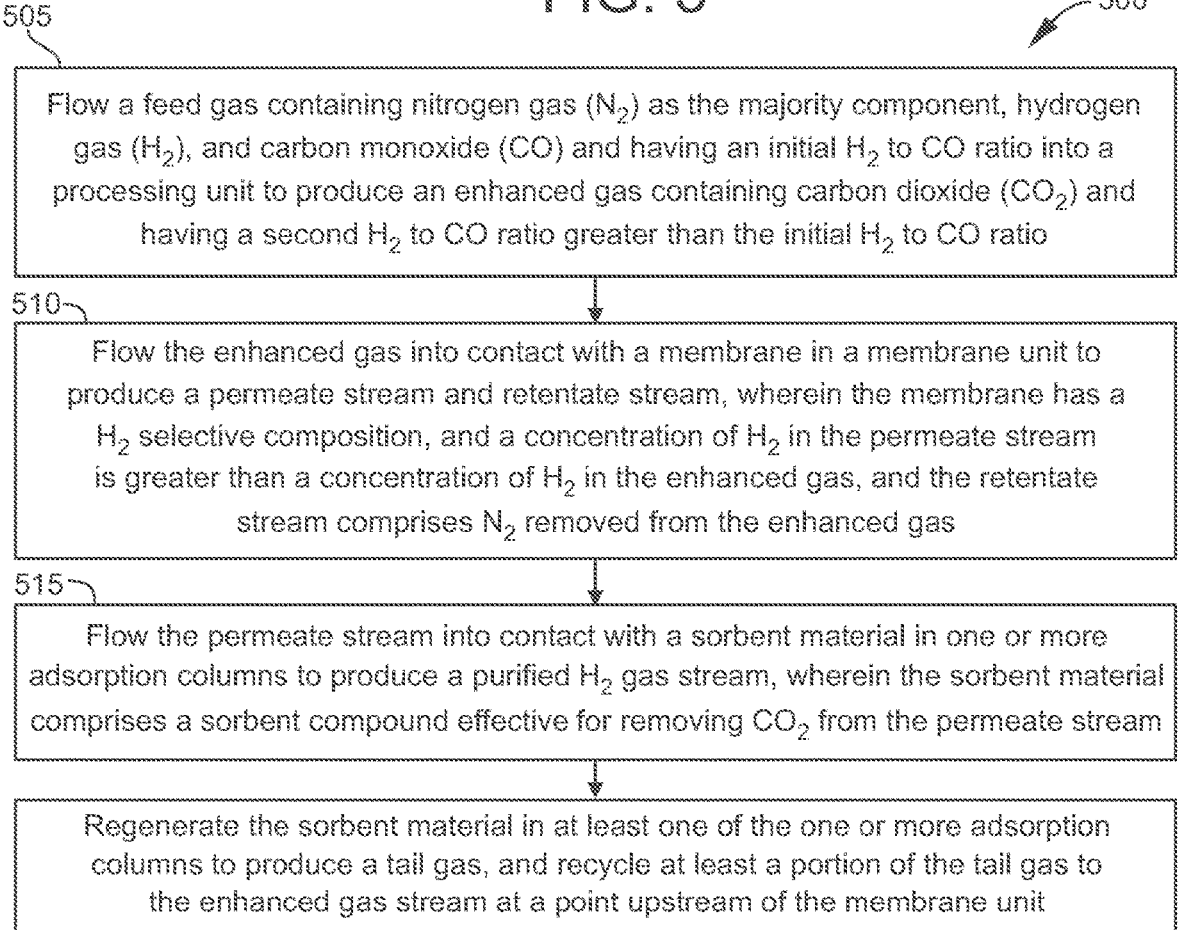
FIG. 4 is an exemplary flowchart of a method for producing a purified hydrogen gas stream according to some embodiments.

FIG. 4 illustrates another general flow diagram a method 500 for producing a purified hydrogen gas stream according to various embodiments. At step 505, a feed gas containing $N_2$ as the majority component, $H_2$, and CO may flow into a processing unit 110 to produce an enhanced gas 5. The feed gas may have an initial $H_2$ to CO ratio, and may have a second $H_2$ to CO ratio greater than the initial $H_2$ to CO ratio. The enhanced gas 5 may flow into contact with a membrane in a membrane unit 305 to produce a permeate stream 310 and a retentate stream 315 at step 510. The membrane may have a $H_2$ selective composition. A concentration of $H_2$ in the permeate stream 310 may be greater than a concentration of $H_2$ in the enhanced gas 5, and the retentate stream 315 may comprise $N_2$ and other contaminants that are removed from the enhanced gas 5. At step 515, the permeate stream 310 may flow into contact with an adsorbent material in one or more adsorption columns 370 to produce a purified $H_2$ gas stream 345. The adsorbent material may comprise a sorbent compound effective for removing $N_2$ or $H_2O$ or CO or $CO_2$ from the permeate stream 310. At step 520, the adsorbent material in one or more of the adsorption columns 370 may be regenerated to produce a tail gas 350. At least a portion of the tail gas 350 may be recycled to the enhanced gas stream 5 at a point upstream of the membrane unit 305.

Figure 5:
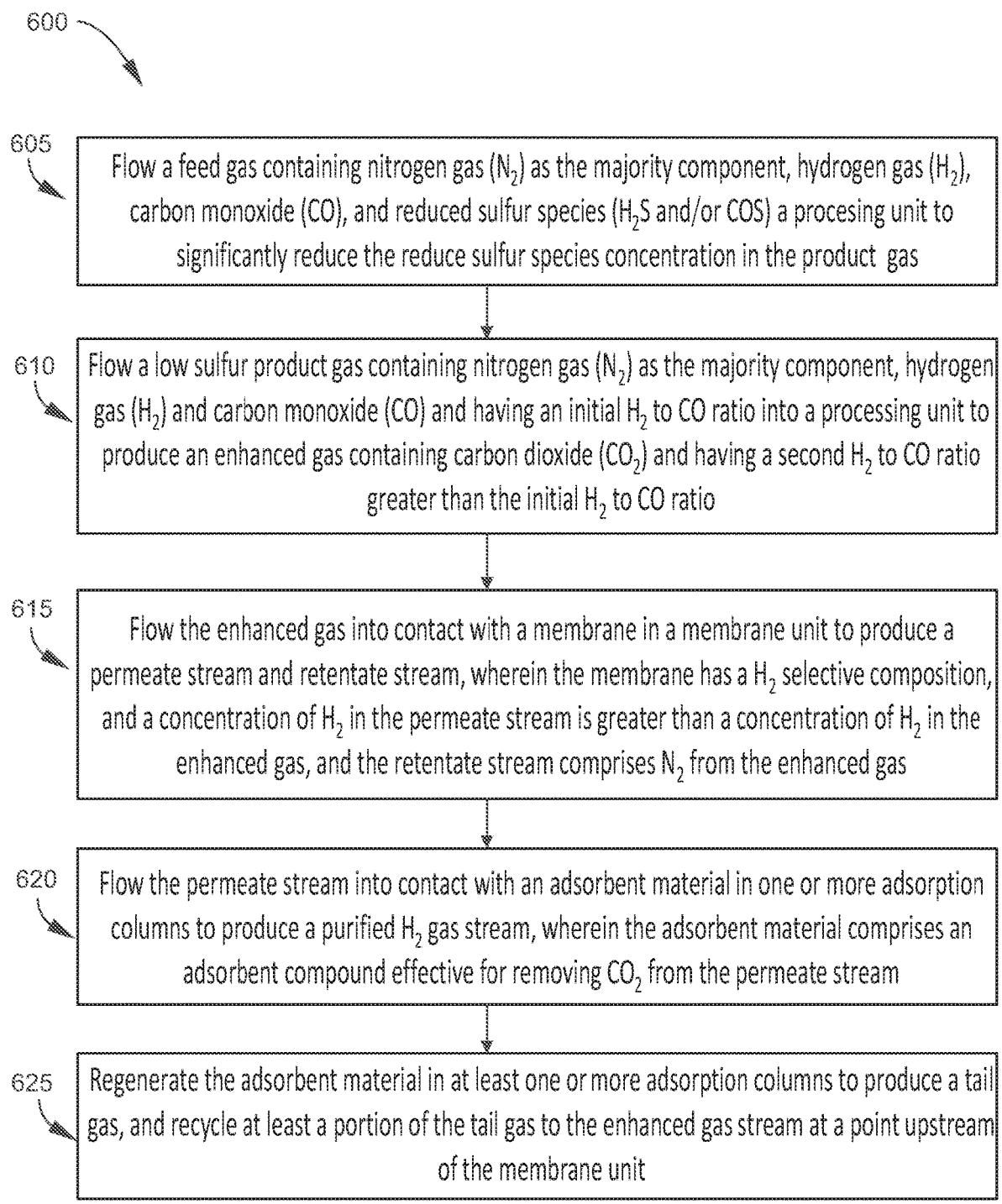
FIG. 5 is an exemplary flowchart of a method for producing a purified hydrogen gas stream according to some embodiments.

FIG. 5 illustrates another general flow diagram a method 600 for producing a purified hydrogen gas stream according to various embodiments. At step 605, a feed gas containing $N_2$ as the majority component, $H_2$, and CO and reduced sulfur species including $H_2S$ and COS may flow into a processing unit to remove this sulfur and to produce a product gas with low sulfur (<50 ppmv). At step 610, this product gas may flow into a processing unit 110 to produce an enhanced gas 5. The product gas flowing into processing unit 110 may have an initial $H_2$ to CO ratio, and may have a second $H_2$ to CO ratio greater than the initial $H_2$ to CO ratio. The enhanced gas 5 may flow into contact with a membrane in a membrane unit 305 to produce a permeate stream 310 and a retentate stream 315 at step 615. The membrane may have a $H_2$ selective composition. A concentration of $H_2$ in the permeate stream 310 may be greater than a concentration of $H_2$ in the enhanced gas 5, and the retentate stream 315 may comprise $N_2$ and other contaminants that are removed from the enhanced gas 5. At step 620, the permeate stream 310 may flow into contact with an adsorbent material in one or more adsorption columns 370 to produce a purified $H_2$ gas stream 345. The adsorbent material may comprise a sorbent compound effective for removing $N_2$ or $H_2O$ or CO or $CO_2$ from the permeate stream 310. At step 625, the adsorbent material in one or more of the adsorption columns 370 may be regenerated to produce a tail gas 350. At least a portion of the tail gas 350 may be recycled to the enhanced gas stream 5 at a point upstream of the membrane unit 305.

EXAMPLE

Aspen HYSYS® (Aspen Technology, Inc., Bedford, Mass.) process models were developed for the $H_2$ purification process illustrated in FIG. 2. The syngas (feed) was assumed to be that produced by partial oxidation of methane and air. Table 2 presents the results of a material balance on the purification process as calculated by the HYSYS model.

TABLE 2

Modeled Material Balance for the Purification Process.

| | Unit | Feed | Retentate | Permeate | PSA Inlet | Water | Recycle | Product |
|---|---|---|---|---|---|---|---|---|
| Temperature | °C. | 30 | 29 | 30 | 35 | 35 | 33 | 34 |
| Pressure | kPa | 300 | 270 | 100 | 970 | 970 | 100 | 900 |
| Molar Flow | kg/mole/hr | 20.4 | 14.0 | 11.8 | 11.6 | 0.3 | 5.5 | 6.1 |
| Mass Flow | kg/hr | 447.1 | 430.0 | 155.8 | 150.8 | 5.0 | 138.5 | 12.3 |

TABLE 2-continued

Modeled Material Balance for the Purification Process.

| | Unit | Feed | Retentate | Permeate | PSA Inlet | Water | Recycle | Product |
|---|---|---|---|---|---|---|---|---|
| | | | Mole Fraction | | | | | |
| $CO_2$ | | 0.1322 | 0.1931 | 0.2189 | 0.2241 | 0.0008 | 0.4741 | 0.0000 |
| $H_2O$ | | 0.0141 | 0.0000 | 0.0294 | 0.0062 | 0.9992 | 0.0131 | 0.0000 |
| $CH_4$ | | 0.0111 | 0.0162 | 0.0003 | 0.0003 | 0.0000 | 0.0006 | 0.0000 |
| $N_2 + Ar$ | | 0.5181 | 0.7537 | 0.0528 | 0.0540 | 0.0000 | 0.1139 | 0.0003 |
| $O_2$ | | 0.0000 | 0.0000 | 0.0000 | 0.0000 | 0.0000 | 0.0000 | 0.0000 |
| $H_2$ | | 0.3035 | 0.0067 | 0.6948 | 0.7114 | 0.0000 | 0.3898 | 0.9997 |
| CO | | 0.0209 | 0.0304 | 0.0039 | 0.0040 | 0.0000 | 0.0085 | 0.0000 |
| Membrane Stage Cut | | 58.2% | | | | | | |
| $H_2$ Flow | kg/day | 296.6 | 4.5 | 395.0 | 395.0 | 0.0 | 102.3 | 292.7 |
| MW | | 21.9 | 30.7 | 13.1 | 13.0 | 18.0 | 25.3 | 2.0 |
| Volumetric Flow | scfm | 268.7 | 184.7 | 156.4 | 152.7 | 3.7 | 72.2 | 80.5 |

The above Example is for illustrative purposes only and does not restrict the invention to the processes used in the example.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for producing a purified hydrogen gas stream, the method comprising:
    flowing a fuel and an oxidizer into an internal combustion engine to produce a feed gas containing nitrogen gas ($N_2$) as the majority component, hydrogen gas ($H_2$), and carbon monoxide (CO) and having an initial $H_2$ to CO ratio;
    flowing the feed gas into a processing unit to produce an enhanced gas containing carbon dioxide ($CO_2$) and having a second $H_2$ to CO ratio greater than the initial $H_2$ to CO ratio;
    flowing the enhanced gas into a purification unit comprising a $N_2$ removal unit to remove $N_2$ and a $CO_2$ removal unit to remove $CO_2$, wherein the purification unit produces a purified hydrogen gas stream and a tail gas containing residual $H_2$; and
    recycling about 50 percent to about 100 percent of the tail gas containing residual $H_2$ to a point upstream of the $N_2$ removal unit so as to increase the $H_2$ recovery.

2. The method of claim 1, wherein flowing the enhanced gas into the purification unit comprises flowing the enhanced gas into the $N_2$ removal unit to produce a permeate stream and a retentate stream, and flowing the permeate stream into the $CO_2$ removal unit to produce the purified hydrogen gas stream and the tail gas.

3. The method of claim 1, wherein the initial $H_2$ to CO ratio is selected from the group consisting of: about 1 to about 3; and about 1.5 to about 2.5.

4. The method of claim 1, wherein the processing unit comprises a water-gas shift unit configured to shift the feed gas to produce $H_2$ and $CO_2$.

5. The method of claim 2, wherein the $N_2$ removal unit comprises a membrane separation unit configured to receive the enhanced gas.

6. The method of claim 5, wherein the membrane separation unit comprises a $H_2$ selective membrane.

7. The method of claim 6, wherein the $H_2$ selective membrane comprises one or more of a polymer, a ceramic, a carbon compound, activated carbon, and a metallic compound.

8. The method of claim 1, wherein a concentration of $H_2$ in the purified $H_2$ gas stream is selected from the group consisting of: greater than about 75 percent; greater than about 90 percent; greater than about 95 percent; and greater than about 99 percent.

9. A method for producing a purified hydrogen gas stream, the method comprising:
    flowing a fuel and an oxidizer into an internal combustion engine to produce a feed gas containing nitrogen gas ($N_2$) as the majority component, hydrogen gas ($H_2$), and carbon monoxide (CO) and having an initial $H_2$ to CO ratio;
    flowing the feed gas into a processing unit to produce an enhanced gas containing carbon dioxide ($CO_2$) and having a second $H_2$ to CO ratio greater than the initial $H_2$ to CO ratio;
    flowing the enhanced gas into contact with a membrane in a membrane unit to produce a permeate stream and a retentate stream, wherein the membrane has a $H_2$ selective composition, and a concentration of $H_2$ in the permeate stream is greater than a concentration of $H_2$ in the enhanced gas, and the retentate stream comprises $N_2$ that has been removed from the enhanced gas;
    flowing the permeate stream into contact with a sorbent material in one or more adsorption columns to produce a purified $H_2$ gas stream, wherein the sorbent material comprises a sorbent compound effective for removing $CO_2$ from the permeate stream; and
    regenerating the sorbent material in at least one of the one or more adsorption columns to produce a tail gas containing residual $H_2$, and recycling about 50 percent to about 100 percent of the tail gas containing residual $H_2$ to the enhanced gas stream at a point upstream of the membrane unit so as to increase the $H_2$ recovery.

10. The method of claim 9, wherein the processing unit comprises a water-gas shift unit.

11. The method of claim 9, wherein a mole fraction of $H_2$ in the purified $H_2$ gas stream is greater than about 99 percent.

12. The method of claim 9, wherein an amount of $H_2$ present in the enhanced gas and recovered in the purified $H_2$ gas stream is selected from the group consisting of: greater than about 80 percent; greater than about 90 percent; greater than about 95 percent; and greater than about 99 percent.

* * * * *